UNITED STATES PATENT OFFICE.

ARTHUR LIEBRECHT, OF FRANKFORT-ON-THE-MAIN, AND GEORG ROSENFELD, OF BRESLAU, GERMANY.

MANUFACTURE OF GLYCOHEPTONIC ACID.

1,057,437.   Specification of Letters Patent.   Patented Apr. 1, 1913.

No Drawing.   Application filed April 20, 1912.   Serial No. 692,121.

*To all whom it may concern:*

Be it known that we, ARTHUR LIEBRECHT, Ph. D., chemist, and GEORG ROSENFELD, Ph. D., professor of medicine, citizens of the Empire of Germany, residing, respectively, at Frankfort-on-the-Main and Breslau, Germany, have invented certain new and useful Improvements in the Manufacture of Glycoheptonic Acid, of which the following is a specification.

Our present invention relates to the manufacture of glycoheptonic acid, the preparation of which by the process hitherto used is firstly expensive, owing to the fact that one must start from pure dextro-glucose (grape-sugar), and secondly occupies much time because the final product must be allowed to stand for some weeks in order that it may crystallize.

Now we have found that, even when using commercial dextro-glucose, it is possible to produce in a very simple way and with a good yield a pure and quickly crystallizing glycoheptonic acid, by treating with barium hydrate, cold or with heat, the product obtained by the addition of hydrocyanic acid to dextro-glucose, separating the precipitate which is formed after a short time and decomposing it by means of sulfuric acid, but not, as proposed by E. Fischer (see *Liebig's Annalen* 270, page 71) decomposing the liquid by means of sulfuric acid. The barium sulfate thus produced is filtered off and the filtrate evaporated *in vacuo* can be easily crystallized.

According to the processes described by Kiliani (*Berichte der Deutschen Chemischen Gesellschaft* No. 19 page 767) and by Fischer (*Liebig's Annalen* 270, page 71), it is advantageous to use pure hydrocyanic acid in order that the crystallized final product may not be rendered impure by salts, whereas our present process permits the direct use of potassium cyanid and acid.

As the product of the addition of hydrocyanic acid to dextro-glucose is transformed into the ammonium salt by the action of water, the operation may of course also be carried out by decomposing the ammonium salt by means of a mineral acid, expelling the hydrocyanic acid from the liquid by heating and then passing a current of air through it and precipitating the glycoheptonic acid, now present in a free state, by means of barium hydrate, or barium carbonate and barium hydrate.

The following example illustrates our invention: 5 kilos of dextro-glucose and 25 liters of hydrocyanic acid of 3% strength, or preferably the corresponding mixture of potassium cyanid and hydrochloric acid, are heated for 6 days at 25–30° C. For starting the reaction about 20 cc. of ammonia are added to the mixture. When the reaction is finished the hydrocyanic acid is expelled, the mass is heated, and when the temperature has risen to 60° C. there are added 8½ kg. of barium hydrate. At first the liquid remains clear, but after a short time precipitation occurs and finally a thick magma consisting of a finely crystallized precipitate is formed. After cooling, the mass is filtered, and the precipitate is thoroughly washed with water and is decomposed in the usual manner by means of sulfuric acid. The barium sulfate is filtered off and the filtrate is evaporated *in vacuo* and, if necessary, treated with animal charcoal, whereupon it can be easily crystallized.

Having now described our invention, what we claim is:

1. The process of manufacturing glycoheptonic acid, which consists in treating with barium hydrate the product obtained by the addition of hydrocyanic acid to dextro-glucose, decomposing the resulting precipitate with sulfuric acid, filtering off the barium sulfate, and causing the glycoheptonic acid to crystallize from the filtrate.

2. The process of manufacturing glycoheptonic acid, which consists in treating with barium hydrate, cold, the product obtained by the addition of hydrocyanic acid to dextro-glucose, decomposing the resulting precipitate with sulfuric acid, filtering off the barium sulfate, and causing the glycoheptonic acid to crystallize from the filtrate by evaporation.

3. The process of manufacturing glycoheptonic acid, which consists in treating with an acid the product of the addition of hydrocyanic acid to dextro-glucose, expelling the hydrocyanic acid from the liquid, adding barium hydrate, filtering the precipitate, washing and decomposing it with sulfuric acid, filtering off the barium sulfate, and evaporating the filtrate, whereupon the glycoheptonic acid crystallizes out.

4. The process of manufacturing glycoheptonic acid, which consists in treating with an acid the product of the addition of hydrocyanic acid to dextro-glucose, expelling the hydrocyanic acid from the liquid, adding barium hydrate and carbonate, filtering the precipitate, washing and decomposing it with sulfuric acid, filtering off the barium sulfate, and evaporating the filtrate, whereupon the glycoheptonic acid crystallizes out.

In testimony whereof, we affix our signatures in presence of two witnesses.

ARTHUR LIEBRECHT.
GEORG ROSENFELD.

Witnesses:
 JEAN GRUND,
 CARL GRUND.